(12) United States Patent
Wagner et al.

(10) Patent No.: US 10,664,291 B2
(45) Date of Patent: May 26, 2020

(54) TIRE PRESSURE MONITORING UNIT WITH EXPANDABLE PROGRAM LIBRARY AND METHOD FOR SUPPLEMENTING A PROGRAM LIBRARY OF A TIRE PRESSURE MONITORING UNIT

(71) Applicant: Huf Hülsbeck & Fürst Gmbh & Co. KG, Velbert (DE)

(72) Inventors: Markus Wagner, Ludwigsburg (DE); Patrick Vögeli, Karlsruhe (DE); Peter Brand, Kieselbronn (DE)

(73) Assignee: HUF BAOLONG ELECTRONICS BRETTEN GMBH, Bretten (DE)

( * ) Notice: Subject to any disclaimer, the term of this patent is extended or adjusted under 35 U.S.C. 154(b) by 0 days.

(21) Appl. No.: 16/208,999

(22) Filed: Dec. 4, 2018

(65) Prior Publication Data
US 2019/0188011 A1  Jun. 20, 2019

(30) Foreign Application Priority Data
Dec. 18, 2017 (DE) .......................... 10 2017 130 295

(51) Int. Cl.
*G06F 9/445* (2018.01)
*B60C 23/04* (2006.01)
(Continued)

(52) U.S. Cl.
CPC ...... *G06F 9/44526* (2013.01); *B60C 23/0408* (2013.01); *B60C 23/0445* (2013.01);
(Continued)

(58) Field of Classification Search
None
See application file for complete search history.

(56) References Cited

U.S. PATENT DOCUMENTS

| 7,518,495 | B2 * | 4/2009 | Tang | ................... | B60C 23/0408 340/442 |
| 2009/0033478 | A1 * | 2/2009 | Deniau | ............... | B60C 23/0408 340/442 |

(Continued)

FOREIGN PATENT DOCUMENTS

| WO | 2009-059274 A2 | 5/2009 |
| WO | 2011-061455 A1 | 5/2011 |

*Primary Examiner* — Philip Wang
(74) *Attorney, Agent, or Firm* — Hackler Daghighian Martino & Novak

(57) ABSTRACT

A tire pressure monitoring unit includes a pressure sensor, a temperature sensor, a transmitter for wireless transmission of pressure and temperature data HF signals, a receiver for receiving wireless control LF signals, a microcontroller containing a program memory and a data storage device containing a library of control programs to control the measurement and transmission activity of the tire pressure monitoring unit. The microcontroller selects from this library, on the basis of control signals that are received, a control program and then writing it into its program memory. When a loading program is activated by a control signal, it causes the microcontroller to transfer into the data storage device an additional control program that is received by the receiver. A method includes adding, to a library of control programs in a data storage device connected to a microcontroller of a tire pressure monitoring unit, an additional control program.

8 Claims, 1 Drawing Sheet

(51) Int. Cl.
  *B60C 23/20* (2006.01)
  *H04L 29/08* (2006.01)
(52) U.S. Cl.
  CPC ...... *B60C 23/0462* (2013.01); *B60C 23/0471* (2013.01); *B60C 23/0479* (2013.01); *B60C 23/20* (2013.01); *H04L 67/34* (2013.01)

(56) References Cited

U.S. PATENT DOCUMENTS

| | | |
|---|---|---|
| 2013/0061456 A1 | 3/2013 | Lefaure et al. |
| 2013/0204548 A1* | 8/2013 | Yu ................ B60C 23/0423 702/50 |
| 2014/0122982 A1* | 5/2014 | Gavin ................ H03M 13/09 714/807 |
| 2015/0015387 A1* | 1/2015 | McIntyre ............ B60C 23/0471 340/447 |
| 2015/0202932 A1* | 7/2015 | Kessler ................ B60C 23/04 340/445 |
| 2016/0039253 A1* | 2/2016 | Wagner .............. B60C 23/0454 340/442 |
| 2016/0039254 A1* | 2/2016 | Wagner ................ B60C 23/02 340/442 |
| 2016/0303926 A1* | 10/2016 | Hongjing ............ B60C 23/0471 |

* cited by examiner

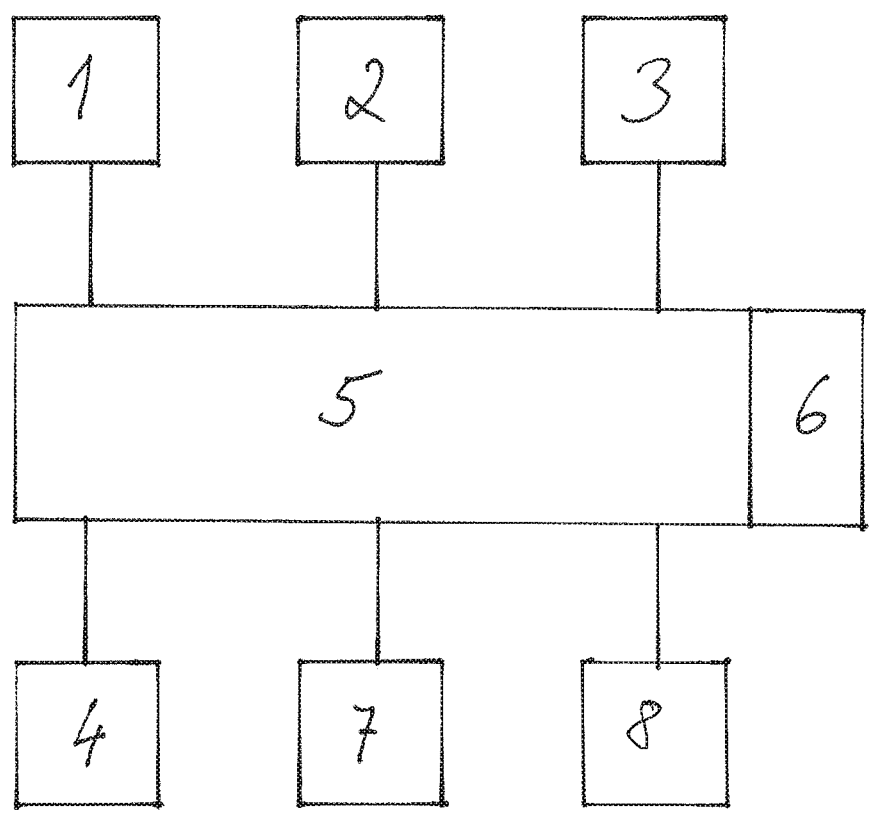

TIRE PRESSURE MONITORING UNIT WITH EXPANDABLE PROGRAM LIBRARY AND METHOD FOR SUPPLEMENTING A PROGRAM LIBRARY OF A TIRE PRESSURE MONITORING UNIT

CROSS-REFERENCE TO RELATED APPLICATIONS

This application claims priority to German Patent Application No. 10 2017 130 295.6, filed Dec. 18, 2017, the entire contents of which are hereby incorporated in full by this reference.

DESCRIPTION

Field of the Invention

This invention relates to a tire pressure monitoring unit comprising a microcontroller. The microcontroller comprises a program memory and connected to it a data storage device which stores a library of control programs for controlling the measurement and transmission activity of the tire pressure monitoring unit. The microcontroller selects from this library, on the basis of the control signals that are received, a control program and writes it into its program memory.

Background of the Invention

At the present time, there are about 100 different commercially used vehicle tire pressure monitoring systems, each of which comprises a wheel-mounted tire pressure monitoring unit that measures the tire pressure and transmits pressure data over a wireless interface to a central unit. Although the different tire pressure monitoring systems use the same frequency ranges for the wireless transmission of pressure data, namely 315 MHz or 433 MHz, they differ with respect to the measurement and transmission intervals, pressure thresholds that trigger transmission activity, and the structure or format of the data that is transmitted, among other things. Garages and car workshops prefer universal tire pressure monitoring units that can be used for all commonly used tire pressure monitoring systems.

In order for a tire pressure monitoring unit to be universal, its controller must be programmed to adapt it to the respective tire pressure monitoring system, so that the measurement and transmission activity takes place at the intervals and threshold values prescribed for the system in question, so that the transferring data protocols match the system in question, and so that other possible constraints on the measurement and transmission activity of the tire pressure monitoring system are observed.

U.S. Pat. No. 7,518,495 B2 discloses an almost universal tire pressure monitoring unit containing a data storage device that stores a library of control programs for controlling measurement and transmission activity of the tire pressure monitoring unit. A control signal that is transmitted from a hand-held device over a wireless interface is used to select one of the control programs from the library. This control program is then used to control the measurement and transmission activity of this tire pressure monitoring unit. This makes it possible, in a garage, to adapt a tire pressure monitoring unit to a given tire pressure monitoring system.

A problem of the tire pressure monitoring unit disclosed in U.S. Pat. No. 7,518,495 B2 is that its program library cannot be supplemented. That is, if a new tire pressure monitoring system is brought onto the market, and the new tire pressure monitoring system requires that the tire pressure monitoring unit have a new control program, existing tire pressure monitoring units cannot be used for this new system. Although the manufacturer can, when producing new tire pressure monitoring units, provide a larger library with an additional control program, it is impossible to supplement the program library of tire pressure monitoring units in a garage or a car workshop. Therefore, it is uneconomical for suppliers and workshops to keep larger numbers of this tire pressure monitoring device on hand.

Therefore, it is an object of the invention to show how an additional control program can be added to the control program library in a tire pressure monitoring unit after the manufacturing process is completed. In particular, it should be possible to supplement the program library in a garage or a car workshop.

SUMMARY OF THE INVENTION

This object is met by a tire pressure monitoring unit having the features indicated in claim 1 and by a process according to claim 8. Advantageous refinements of the invention are the subject of the dependent claims.

A tire pressure monitoring unit according to the present invention comprises a pressure sensor, a temperature sensor, a transmitter for wireless transmission of pressure and temperature data in the form of HF signals, for example in the area of 315 MHz or in the area of 433 MHz, and a receiver for receiving wireless control signals in the form of LF signals, for example in the range between 100 kHz and 200 kHz, for instance 125 kHz. The measurement and transmission activity of the tire pressure monitoring unit is controlled by a microcontroller comprising a program memory.

The program memories of available microcontrollers are too small to contain control programs for all common tire pressure monitoring systems. Therefore, the microcontroller has a data storage device connected to it containing a library of control programs for controlling the measurement and transmission activity of the tire pressure monitoring unit. Depending on the control signals that are received, the microcontroller selects from this library a control program and writes it into its program memory. In addition, a special control signal received by the receiver can cause a tire pressure monitoring unit of the present invention to transfer an additional control program that is received by the receiver in the form of LF signals into the data storage device, and to thereby add this additional control program to the program library that is stored in the data storage device.

Data transmission by LF signals is relatively slow, and therefore usually not ideal for the transfer of larger quantities of data. However supplementing the program library that is present in the data storage device of the tire pressure monitoring unit is relatively rarely required, and if it is required, as a rule it is only necessary to transfer one or two additional control programs. A data volume of 8 kilobytes can easily be transferred to a tire pressure monitoring unit in the form of LF signals in less than half a minute, so that the program library can, as a rule, be supplemented within one minute or less. Thus, in a garage or car workshop it is relatively easy to adapt a supply of tire pressure monitoring units to the requirements of new tire pressure monitoring systems.

An advantageous refinement of the invention provides that the microcontroller checks the additional control program for transmission errors after it is received, and acknowledge error-free transfer by a signal, for example a HF signal transmitted by the transmitter of the tire pressure monitoring unit. This allows the transmission process to be repeated, if necessary.

Another advantageous refinement of the invention provides that after the additional control program is received it is first stored in the program memory and then transferred from there into the data storage device. This makes it especially simple and quick for the microcontroller to check the received control program for transmission errors.

The additional control program is transferred into the data storage device by means of a loading program that is activated by reception of a control signal. The loading program can be stored in the program memory when the microcontroller is in a base state in which it is supplied by the manufacturer. Since memory space in the program memory is limited, it is preferable if at least part of the loading program in the program memory of the microcontroller is overwritten with the additional control program when the loading program is activated. After the additional control program has been transferred into the data storage device, the loading program can then be copied from the data storage device back into the program memory, so that when required another additional control program can be received and transferred into the data storage device.

Another advantageous refinement of the invention provides that the loading program is configured to select, on the basis of control signals that are received, a control program from the library of the data storage device and cause the microprocessor to transfer this control program into the program memory. When this happens, the loading program in the program memory of the microcontroller can also be overwritten completely or in part by the control program in question.

The tire pressure monitoring unit can be configured so that all or some parts of the loading program are transferred into the data storage device before they are overwritten in the program memory of the microcontroller. However, it is also possible that a copy of the loading program, or a copy of those parts of it that are overwritten when necessary, permanently remains in the data storage device and is copied, when necessary, from there into the program memory.

An advantageous further refinement of the invention provides that the data storage device be at least 16 times as large as the program memory. For example, the data storage device can be 32 times as large as the program memory, or even larger. The program memory typically has a size of 32 kilobytes or less, for example 16 kilobytes. The data storage device can have, for example, a size of 256 kilobytes or more, for example 512 kilobytes or more. An example of a memory that is suitable for the data storage device and the program memory is EEPROM, especially flash EEPROM.

A method according to the present invention for adding, to a library of control programs in a data storage device connected to a microprocessor of a tire pressure monitoring unit, an additional control program involves this additional control program being received by a receiver of the tire pressure monitoring unit in the form of LF signals. The additional control program is then stored, for example by means of a loading program, in a program memory, which is integrated into the microcontroller and the additional control program is then read from the program memory and written into the data storage device.

An advantageous further refinement of the invention provides that the microcontroller communicate with the data storage device via an SPI bus. That is, the additional control program is preferably transferred from the microcontroller into the data storage device via an SPI bus.

Another advantageous further refinement of the invention provides that after the additional control program is stored in the data storage device, the loading program is transferred from the data storage device into the program memory and, when this loading program is activated by wireless LF control signals received by the tire pressure monitoring unit, it selects one of the control programs from the library and loads it into the program memory.

BRIEF DESCRIPTION OF THE DRAWINGS

Further details and advantages of the invention are explained on the basis of an illustrative embodiment with reference to the attached drawings.

FIG. 1 is a schematic representation of an embodiment of an inventive tire pressure monitoring unit.

DETAILED DESCRIPTION OF THE PREFERRED EMBODIMENTS

The tire pressure monitoring unit schematically represented in FIG. 1 comprises a pressure sensor 1, a temperature sensor 2, a transmitter 3 for wireless transmission of pressure and temperature data in the form of HF signals, a receiver 4 for receiving wireless control signals in the form of LF signals, a microcontroller 5 containing a program memory 6 and, connected to the microcontroller 5, a data storage device 7 containing a library of control programs for controlling the measurement and transmission activity of the tire pressure monitoring unit. The microcontroller 5 is configured to select from this library, on the basis of control signals that are received, a control program and to then write it into its program memory 6. In addition, the tire pressure monitoring unit comprises a power supply 8, for example a battery or a generator, in particular a piezoelectric generator.

In the embodiment shown, the pressure sensor 1 and the temperature sensor 2 are connected to the microcontroller 5. However, the pressure sensor 1 and the temperature sensor 2 can also be integrated into the microcontroller 5, as the program memory 6 is. The tire pressure monitoring unit can additionally comprise other sensors, for example accelerometers. The individual components of the tire pressure monitoring unit are arranged in a housing that is configured to be mounted on a tire, for example on a tire valve.

When the tire pressure monitoring unit is delivered from the manufacturer, the program memory of the microcontroller 5 has a loading program stored in it. When the loading program is activated by control signals that have been received by the receiver 4, the microprocessor 5 can, by means of the loading program, select from the program library stored in the data storage device 7 a control program that has been specified by the control signals that were received, and then load this control program into its program memory 6. Thereby the tire pressure monitoring unit can be adapted to a given tire pressure monitoring system, for example in order to replace a single tire pressure monitoring unit in a vehicle equipped with such a system. Since the memory space in the program memory 6 is limited, it can be advantageous if the selected control program entirely or partly overwrites the loading program.

Suitable control signals that are received by the receiver 4 can also announce to the microcontroller 5 the transfer of another control program by LF signals. In this case, the loading program causes the microprocessor 5 to write the other control program into the program memory 6. In the process, the loading program can also be entirely or partly overwritten by the control program. Then, this other control program is written from the program memory 6 into the data storage device 7 and added to the library of control programs that is present there.

If the loading program in the program memory 6 of the microprocessor 5 has, in the process, previously been overwritten by the additional control program, the loading program is now, following the writing of the additional control program into the data storage device 7, copied back from the data storage device 7 into the program memory 6 of the microcontroller 5. That is, the microcontroller 5 is then back in its base state in which it was delivered in the tire pressure monitoring unit from the manufacturer of the tire pressure monitoring unit, so that suitable control signals can cause one of the control programs now contained in the data storage device 7 to be selected and written into the program memory 6 of the microcontroller 5.

The loading program can be permanently stored in the program library in the data storage device 7, so that the loading program can always, when needed, be copied back into the program memory 6 of the microcontroller 5. However, it is also possible that the loading program is entirely or partly copied from the program memory 6 into the data storage device 7 before the corresponding parts of the loading program are overwritten in the program memory 6 by a selected control program or an additional control program received in the form of LF signals.

The data storage device 7 is substantially larger than the program memory 6, for example 16 times as large, or even larger. For example, the program memory 6 can have a size of 32 kilobytes or 16 kilobytes, while the data storage device 7 has a size of at least 256 kilobytes, for example 512 kilobytes or more.

The microcontroller 5 can communicate with the data storage device 7 and possibly also with other components of the tire pressure monitoring unit via an SPI bus.

Both the program memory 6 and the data storage device 7 of the tire pressure monitoring unit are nonvolatile memories whose contents can always be overwritten back again. An example of a suitable memory is EEPROM, especially flash EEPROM.

LIST OF REFERENCE NUMBERS

1 Pressure sensor
2 Temperature sensor
3 HF transmitter
4 LF receiver
5 Microcontroller
6 Program memory
7 Data storage device
8 Current source

What is claimed is:
1. A tire pressure monitoring unit comprising
a pressure sensor;
a temperature sensor;
a transmitter for wireless transmission of pressure and temperature data in the form of high frequency signals;
a receiver for receiving wireless control signals in the form of low frequency signals;
a microcontroller comprising a program memory;
a data storage device that is connected to the microcontroller and that contains a library of control programs for controlling the measurement and transmission activity of the tire pressure monitoring unit, wherein the microcontroller is configured to select from this library, on the basis of control signals that are received, a control program and to write it into its program memory; and
a loading program that, when activated by a control signal, causes the microcontroller to transfer into the data storage device an additional control program that is received by the receiver.

2. The tire pressure monitoring unit according to claim 1, wherein after the additional control program is received, it is first stored in the program memory and then transferred from there into the data storage device.

3. The tire pressure monitoring unit according to claim 2, wherein when the loading program is activated, at least part of the loading program in the program memory of the microcontroller is overwritten with the additional control program.

4. The tire pressure monitoring unit according to claim 3, wherein that after the additional control program is transferred from the program memory into the data storage device the additional control program in the program memory is overwritten with the loading program or with the part of the loading program previously transferred into the data storage device.

5. The tire pressure monitoring unit according to claim 1, wherein the program memory has a size of 32 kilobytes or less.

6. The tire pressure monitoring unit according to claim 1, wherein the data storage device has a size of at least 512 kilobytes.

7. The tire pressure monitoring unit according to claim 1, wherein the data storage device is at least 16 times as large as the program memory.

8. A method for adding, to a library of control programs in a data storage device connected to a microcontroller of a tire pressure monitoring unit, an additional control program, said method comprising:
receiving the additional control program in the form of low frequency signals by a receiver of the tire pressure monitoring device;
storing the additional control program in a program memory that is integrated into the microcontroller;
reading out the additional control program of the program memory and writing into the data storage device;
transferring the additional control program from the microcontroller into the data storage device via a serial peripheral interface bus; and
wherein after the additional control program has been stored in the data storage device, transferring a loading program from the data storage device into the program memory and, when this loading program is activated by wireless low frequency control signals received by the tire pressure monitoring device, it selects one of the control programs from the library and loads it into the program memory.

* * * * *